United States Patent
Goto et al.

(10) Patent No.: US 7,575,364 B2
(45) Date of Patent: Aug. 18, 2009

(54) MIXING DEVICE AND SLURRYING DEVICE

(75) Inventors: Noboru Goto, Tokyo (JP); Kouzi Sekine, Tokyo (JP)

(73) Assignee: Okutama Kogyo Co., Ltd. (JP)

( * ) Notice: Subject to any disclaimer, the term of this patent is extended or adjusted under 35 U.S.C. 154(b) by 603 days.

(21) Appl. No.: 10/547,002

(22) PCT Filed: Feb. 26, 2004

(86) PCT No.: PCT/JP2004/002270

§ 371 (c)(1), (2), (4) Date: Aug. 26, 2005

(87) PCT Pub. No.: WO2004/076042

PCT Pub. Date: Sep. 10, 2004

(65) Prior Publication Data

US 2006/0164914 A1    Jul. 27, 2006

(30) Foreign Application Priority Data

Feb. 28, 2003    (JP)    ............................. 2003-052716

(51) Int. Cl.
*B01F 3/12*    (2006.01)
*B01F 5/24*    (2006.01)

(52) U.S. Cl. .................................... 366/165.2; 366/336

(58) Field of Classification Search .............. 366/165.1, 366/165.2, 162.4, 165.5, 165.3
See application file for complete search history.

(56) References Cited

U.S. PATENT DOCUMENTS

| | | | | | |
|---|---|---|---|---|---|
| 2,528,094 | A | * | 10/1950 | Walker | 366/165.2 |
| 2,886,297 | A | * | 5/1959 | Crandall | 366/76.91 |
| 3,047,275 | A | * | 7/1962 | Cox | 366/101 |
| 3,201,093 | A | * | 8/1965 | Smith | 366/28 |
| 3,542,342 | A | * | 11/1970 | Barron | 366/178.1 |
| 3,856,269 | A | * | 12/1974 | Fothergill et al. | 366/165.2 |
| 4,007,921 | A | * | 2/1977 | Zingg | 366/10 |
| 4,077,612 | A | * | 3/1978 | Ricciardi | 366/102 |
| 4,092,013 | A | * | 5/1978 | Staaf | 366/165.4 |
| 4,108,732 | A | * | 8/1978 | Nuttall, Jr. | 366/165.1 |
| 4,255,124 | A | * | 3/1981 | Baranowski, Jr. | 366/338 |
| 4,390,284 | A | * | 6/1983 | Hyde et al. | 366/165.5 |

(Continued)

FOREIGN PATENT DOCUMENTS

JP    55-51852    4/1980

(Continued)

*Primary Examiner*—Tony G Soohoo
(74) *Attorney, Agent, or Firm*—Bacon & Thomas, PLLC

(57) ABSTRACT

A cyclone type cylindrical body 10 having a part whose diameter decreases in the direction toward a lower opening from an upper opening is used, and liquid is made fall in the inside of the cylindrical body 10 while swirling and thereby accelerated to form a vortex flow. Fine particles are charged into the center of the vortex flow so as to be wrapped by the vortex flow, and thereby the both are mixed. By this characteristic, the fine particles do not contact with an inner wall of the cylindrical body, and therefore clogging does not occur in the cylindrical body. Moreover, the pressure around the center of the vortex flow becomes negative, and the fine particles are aspirated. Therefore, dust is hardly generated. Thus, a mixing apparatus of a small size that can slurry fine particles without much maintenance cost can be provided.

23 Claims, 4 Drawing Sheets

U.S. PATENT DOCUMENTS

| | | | |
|---|---|---|---|
| 4,498,819 A * | 2/1985 | El-Saie | 406/181 |
| 4,538,921 A * | 9/1985 | Kennedy | 366/178.3 |
| 4,616,935 A * | 10/1986 | Harrison et al. | 366/165.1 |
| 4,692,030 A * | 9/1987 | Tauscher et al. | 366/337 |
| 4,790,666 A * | 12/1988 | Koziol | 366/165.1 |
| 7,175,337 B2 * | 2/2007 | Bergman | 366/165.2 |
| 7,325,967 B2 * | 2/2008 | Hoff et al. | 366/141 |
| 2006/0164914 A1 * | 7/2006 | Goto et al. | 366/165.2 |

FOREIGN PATENT DOCUMENTS

| | | |
|---|---|---|
| JP | 05-035013 | 2/1993 |
| JP | 2706384 B | 10/1997 |
| JP | 10-328542 | * 12/1998 |

* cited by examiner

MIXING DEVICE AND SLURRYING DEVICE

TECHNICAL FIELD

The present invention relates to a mixing apparatus for mixing fine particles and liquid.

BACKGROUND ART

Lime slurry obtained by mixing quicklime or slaked lime and water is widely used for industrial purposes such as elimination of acidic gas and neutralization of wastewater. Moreover, use of slurry obtained by mixing fine particles of magnesium hydroxide, magnesium oxide, calcium hydroxide or the like with water as exhaust gas desulfurization adsorbent, wastewater neutralizer or the like is known. Further, methods of producing calcium carbonate of a desired crystal system showing superior physical properties as a paper coating material by using slaked lime slurry as a raw material are described in Japanese Patent Publication (KOKOKU) No. 55-51852 and Japanese Patent No. 2706384.

When slurry is produced by mixing fine particles of quicklime, slaked lime or the like and liquid such as water, a method of directly charging fine particles into a dissolution tank storing liquid such as water from an upper part of the tank is usually used. In this method, when fine particles are charged into the dissolution tank, fine particles fly and terribly spread around as dusts. Therefore, the dissolution tank is usually sealed, and a large size dust collecting filter apparatus is usually provided on the dissolution tank at the same time to aspirate the dusts and collecting them on a filter.

As described above, in the methods of directly charging fine particles, because of a large amount of producing dusts, a dust collecting filter apparatus of a large size is required, and at the same time, the filter is prone to cause choking, which requires frequent maintenance operations such as washing and exchange of the filter. Moreover, the methods also have a problem that aggregates of fine particles contact with and adhere to a sidewall of the dissolution tank without being completely dissolved or dispersed, and thus so-called scales are prone to be formed. A phenomenon that aggregates of fine particles that cannot be dissolved or dispersed remain in slurry to form floating aggregates is also likely to occur.

Japanese Patent Publication (KOKOKU) No. 5-35013 discloses a slurrying apparatus for preventing dusting upon charging of fine particles into water. This slurrying apparatus has a slurry storage tank and a slurrying tank storing water and connected to the slurry storage tank from the side thereof. In the slurrying tank, a fine particle feeding pipe is inserted from the water surface, and the end thereof reaches the neighborhood of the bottom. Fine particles are conveyed by the fine particle feeding pipe with being applied with pressure and injected into water from the end of the pipe. The fine particles are thereby mixed with water in the neighborhood of the bottom of the slurrying tank and thus slurried. As described above, this apparatus is characterized in that the dusting can be suppressed by mixing the fine particles and water at the bottom of water.

DISCLOSURE OF THE INVENTION

As described above, a method of directly charging fine particles into a dissolution tank requires a large sized dust collecting filter apparatus, and thus an apparatus for the method becomes large. Moreover, because maintenance operations for the dust collecting filter apparatus are required, cost for the maintenance is required. Furthermore, it has also the problem that fine particles that are not dissolved or dispersed are likely to remain and form scales or floating aggregates.

On the other hand, the aforementioned slurrying apparatus disclosed in Japanese Patent Publication No. 5-35013 requires installation of a slurrying tank apart from the slurry storage tank, and therefore it has a problem that the apparatus becomes large and requires cost for the installation. Moreover, when the slurrying tank is operated and then stopped, fine particles remaining at the end or inside of the fine particle feeding pipe contact with water, and therefore scales are likely to be formed at these sites, which may cause a problem in the next operation.

An object of the present invention is to provide a small size mixing apparatus that can slurry fine particles without requiring cost for maintenance.

In order to achieve the aforementioned object, in the present invention, a cyclone type cylindrical body having a part whose diameter decreases in the direction toward a lower opening from an upper opening is used, and liquid is made to fall in the inside of the cylindrical body while swirling and thereby accelerated to generate a vortex flow. Fine particles are charged into the vortex flow at the center of the flow so as to be wrapped with the vortex flow, and thereby the both are mixed. By this characteristic, fine particles do not contact with the inner wall of the cylindrical body, and therefore clogging does not occur in the cylindrical body. Moreover, because the pressure around the center of the vortex flow becomes negative, and thus fine particles are aspirated, dusts are hardly generated.

Specifically, the apparatus can have, for example, a configuration that a liquid feeding opening for injecting liquid along the peripheral direction of an inner wall of the cylindrical body is provided on an upper side of the cylindrical body. The liquid supplied from the liquid feeding opening falls while swirling on the inner wall of the cylindrical body. The upper part of the cylindrical body has a fine particle charging opening. Fine particles are charged from the fine particle charging opening along the axial direction of the cylindrical body.

Moreover, for example, the apparatus may be an apparatus having a configuration that a fine particle charging pipe is disposed at an upper opening of the cylindrical body, and a liquid feeding pipe is inserted into the cylindrical body at an upper side of the cylindrical body. The axial direction of the fine particle charging pipe is set to be approximately parallel to the axial direction of the cylindrical body, and the axial direction of the liquid feeding pipe is set to be approximately parallel to the tangential direction of the cylindrical body.

In this case, the axial direction of the fine particle charging pipe may not be exactly parallel to the axial direction of the cylindrical body, and it may be disposed so that fine particles can be charged to the central position of the cylindrical body, and thus fine particles should not contact with the inner wall of the cylindrical body. The axial direction of the liquid feeding pipe may not be exactly parallel to the tangential direction of the cylindrical body, and it may be disposed so that liquid can be supplied so as to swirl on the inner wall of the cylindrical body.

The aforementioned mixing apparatus may also have a configuration that a dispersing pipe is connected to the lower opening of the cylindrical body. Inside the dispersing pipe, a dispersing means for dispersing fine particles in the liquid is disposed.

As for the aforementioned dispersing means, the apparatus may have, for example, a configuration including a dispersing board comprising tabular members combined in a cruciform arrangement.

Under the aforementioned dispersing means, a tank for storing the mixed fine particles and liquid can be disposed.

BEST MODE FOR CARRYING OUT THE INVENTION

Figure 1:
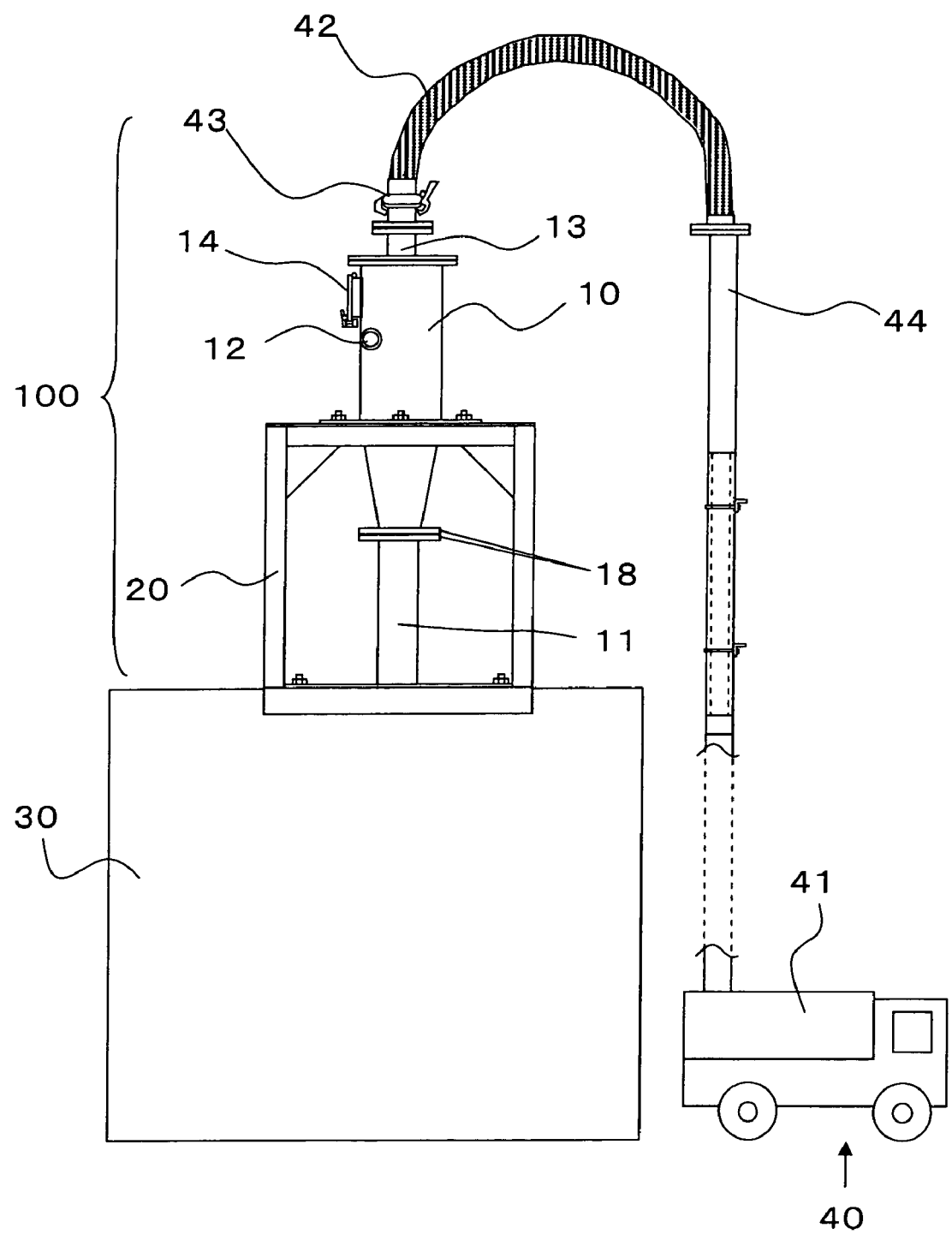
FIG. 1 is a side view showing the whole configuration of the mixing apparatus 100 according to one embodiment of the present invention.

A mixing apparatus according to one embodiment of the present invention will be explained by referring to the drawings.

The mixing apparatus 100 of this embodiment is an apparatus for slurrying fine particles by mixing them with liquid. The mixing apparatus 100 comprises a cyclone type cylindrical member 10 and a dispersing pipe 11 connected to a lower part of the cylindrical member 10 as shown in FIG. 1. The cyclone type cylindrical member 10 is a part for generating a vortex flow with liquid so as to catch up fine particles with the vortex flow and thereby attain mixing. The dispersing pipe 11 is a part for further mixing the fine particles and the liquid mixed by the cyclone type cylindrical member 10 and attaining dispersion. The cyclone type cylindrical member 10 and the dispersing pipe 11 are supported by a trestle 20 disposed on a slurry tank 30 for storing slurry. A lower opening of the dispersing pipe 11 is inserted into an upper opening of the slurry tank 30.

On an upper part of the cyclone type cylindrical member 10, a fine particle charging pipe 13 is provided. To this fine particle charging pipe 13, a fine particle conveying hose 42 is connected using a connecting tool 43. The fine particle conveying hose 42 is connected to a tank 41 of a fine particle carrying-in vehicle 40 via a fine particle conveying pipe 44. The fine particles carried by the fine particle carrying-in vehicle 40 are conveyed via the fine particle conveying pipe 44 and the fine particle conveying hose 42 and charged into the cyclone type cylindrical member 10 via the fine particle charging pipe 13.

On a side of the cyclone type cylindrical member 10, a liquid feeding pipe 12 is provided and connected with a liquid feeding hose (not shown in the drawing). Liquid is supplied into the cyclone type cylindrical member 10 via this liquid feeding pipe 12.

The charged fine particles and liquid become slurry by dispersion of the fine particles in the liquid while they pass through the cyclone type cylindrical member 10 and the dispersing pipe 11, and the slurry falls into and stored in a slurry tank 30.

Figure 2:
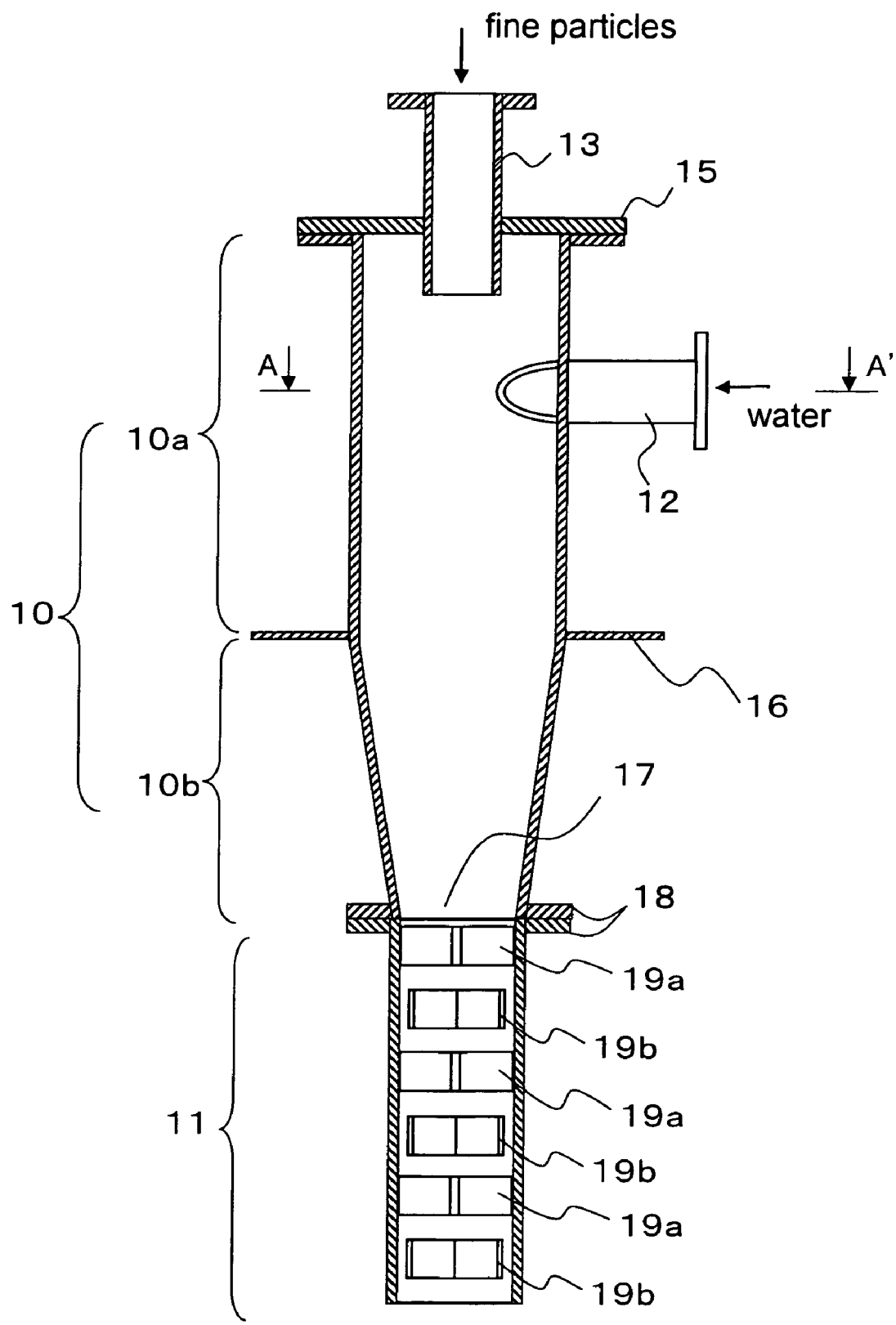
FIG. 2 is a sectional view of the mixing apparatus 100 shown in FIG. 1.

The structure of the cyclone type cylindrical member 10 is specifically explained by referring to the sectional view shown in FIG. 2. The cyclone type cylindrical member 10 has a cylinder portion 10a and a conical portion 10b connected to a lower part of the cylinder portion 10a. A lower opening 17 having a diameter identical to the diameter of the dispersing pipe 11 is provided at the end of the conical portion 10b, and the lower opening is connected to the upper opening of the dispersing pipe 11 with connecting members 18. Further, a lid member 15 is attached to an upper opening of the cylinder portion 10a. The aforementioned fine particle charging pipe 13 is inserted and fixed at the center of the lid member 15. The position of the fine particle charging pipe 13 is adjusted so that the central axis of the fine particle charging pipe 13 should correspond to the central axis of the cyclone type cylindrical member 10.

Figure 3:
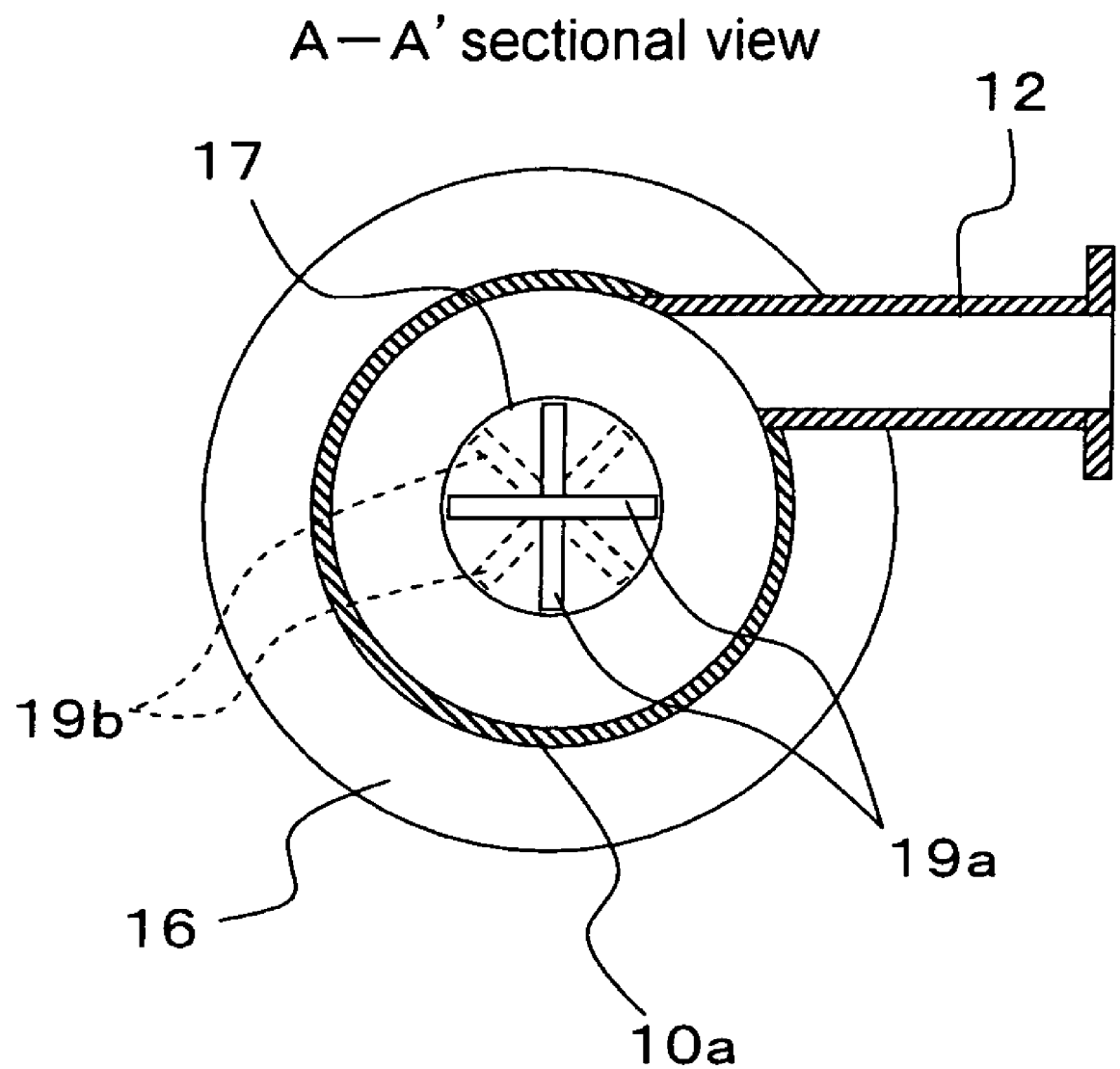
FIG. 3 is a sectional view of the mixing apparatus 100 shown in FIG. 2 along A-A'.

Further, the aforementioned liquid feeding pipe 12 is attached to an upper part of the outer peripheral surface of the cylinder portion 10a of the cyclone type cylindrical member 10 as shown in FIG. 2, and FIG. 3, which shows the sectional view along A-A' indicated in FIG. 2. The axial direction of the liquid feeding pipe 12 is determined to be parallel to the tangential direction of the inner peripheral surface of the cylinder portion 10a. The end of the liquid feeding pipe 12 is processed into such a shape that it should fit the curved surface shape of the inner surface of the cylinder portion 10a.

Furthermore, as shown in FIGS. 2 and 3, the dispersing boards 19a and 19b comprising rigid tabular members fixed in a cruciform arrangement are fixed in the dispersing pipe 11 along the central axis direction of the dispersing pipe 11 as multiple stages (six stages in total in FIG. 2). The dispersing board 19b is fixed so that the directions of the cruciform tabular members should shift by 45° with respect to the cruciform tabular members of the dispersing board 19a. The dispersing board 19a and the dispersing board 19b are alternately disposed.

Figure 4:
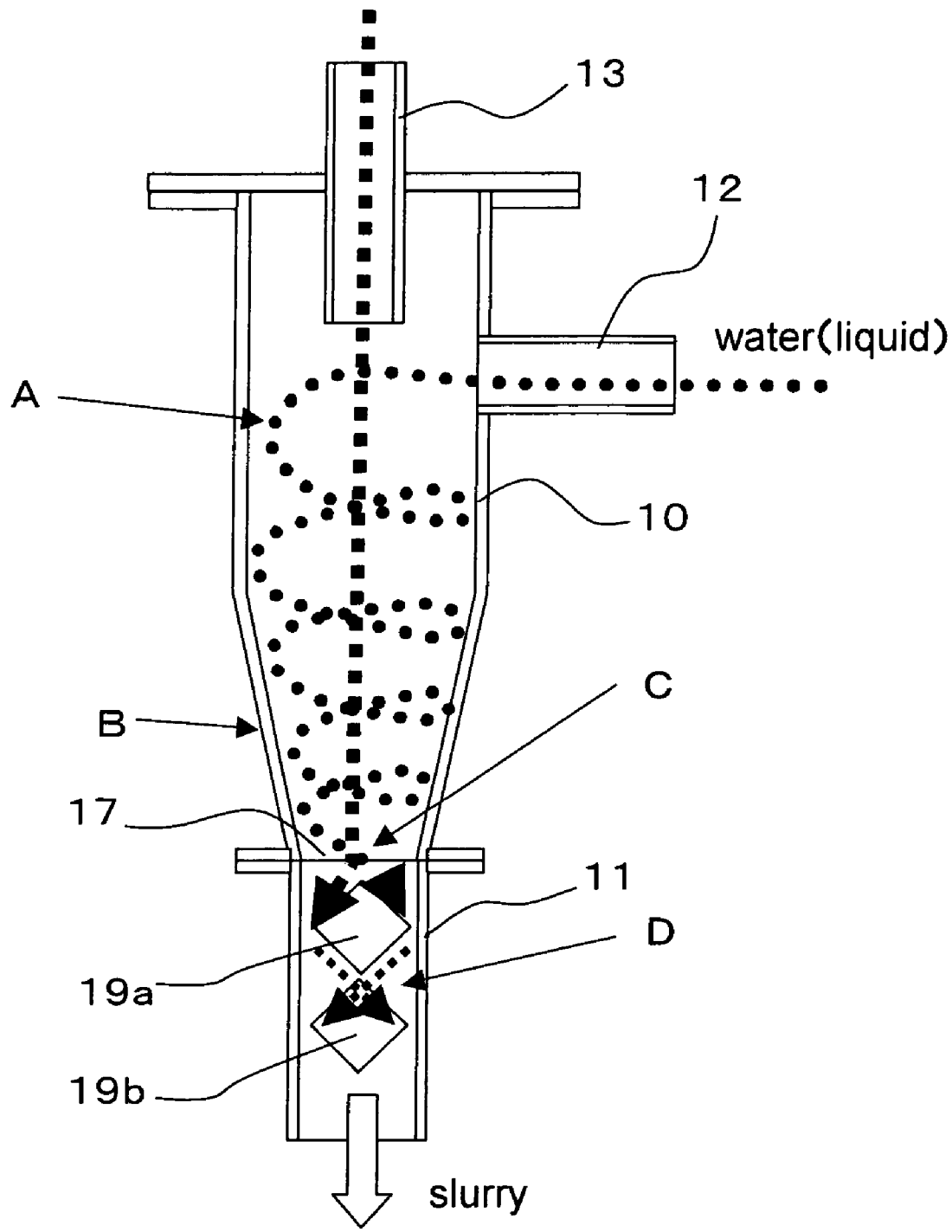
FIG. 4 is an explanatory view showing paths of fine particles and liquid in the mixing apparatus 100 according to the aforementioned embodiment.

As shown in FIG. 4, because of the configuration described above, the liquid supplied from the liquid feeding pipe 12 flows in along the peripheral direction of the inner surface of the cylinder portion 10a, and falls while swirling on the inner wall to form a vortex flow (indicated with the symbol A in FIG. 4). Then, as the diameter of the conical portion 10b decreases, the swirling velocity of the vortex flow is accelerated in the conical portion 10b (indicated with the symbol B in FIG. 4). On the other hand, fine particles fall to the central part of the cyclone type cylindrical member 10 and therefore are caught in the center of the vortex flow and mixed with the flow. The flow of the mixture of the liquid and fine particles mixed in the cyclone type cylindrical member 10 crashes into the uppermost dispersing board 19a in the dispersing pipe 11 (indicated with the symbol C in FIG. 4). Thus, the flow of the mixture is divided by the dispersing board 19a and passed through each of four regions partitioned by the cruciform, and thereby the liquid and fine particles of the mixture are further mixed (indicated with the symbol D in FIG. 4). Then, the flow is successively divided by the dispersing boards 19b of second stage to the dispersing boards 19b of sixth stage and passes through them, and thereby the flow is repeatedly divided and mixed. When the flow passes through the dispersing board 19b of the sixth stage, the fine particles are completely dispersed in the liquid and slurried.

In addition, a flange 16 is provided on the periphery of the connecting portion of the cylinder portion 10a and the conical portion 10b of the cyclone type cylindrical member as shown in FIGS. 2 and 3. This flange 16 is used to fix the cyclone type cylindrical member 10 on the trestle 20. Further, on the outer surface of upper part of the cyclone type cylindrical member 10, an inspection window 14 for checking the inside is provided as shown in FIG. 1. A door that can be opened and closed is attached to the inspection window 14.

Hereafter, the actions of the members of the mixing apparatus 100 according to this embodiment will be specifically explained by exemplifying a case of slurrying slaked lime (calcium hydroxide) by mixing with water to form calcium hydroxide slurry.

First, as shown in FIG. 1, the fine particle conveying hose 42 is connected to the fine particle charging pipe 13 with the connecting tool 43. The fine particle conveying vehicle 40 applies a pressure to slaked lime carried in the tank 41 to send it to the fine particle conveying pipe 44. The slaked lime is conveyed to the fine particle charging pipe 13 by the fine particle conveying pipe 44 and the fine particle conveying hose 42. The conveyed slaked lime falls from the end of the fine particle charging pipe 13 along the central axis of the cyclone type cylindrical member 10 tracing the path shown in FIG. 4.

On the other hand, water (emulsifying water) is supplied by connecting a water feeding hose not shown in the drawing to the liquid feeding pipe 12. Because the supplied water is injected along the inner peripheral surface direction of the cyclone type cylindrical member 10 from the liquid feeding pipe 12, it falls while swirling on the inner surface as shown in FIG. 4. The swirling velocity of the water is accelerated in the conical portion 10b of the cyclone type cylindrical member 10 as the diameter of the conical portion 10b becomes smaller, and it forms a vortex flow around the lower opening 17. Because the pressure of the central part of the conical portion 10b inside the cyclone type cylindrical member 10 becomes negative due to this acceleration, the slaked lime falling along the central axis falls so as to be aspirated into the center of the vortex flow, thus wrapped by the vortex flow, and mixed. Moreover, when the amount of water supplied from the liquid feeding pipe 12 is large, the water surface of the central part of the vortex flow comes to a position higher than the lower opening 17, and therefore the slaked lime is wrapped by the vortex flow and mixed before it arrives at the opening 17.

As described above, the slaked lime mixed with the vortex flow rushes into the dispersing pipe 11 from the lower opening 17 at the flow rate of the vortex flow and crashes with the uppermost dispersing board 19a. By this crash, the slaked lime and water are further mixed. Moreover, the crashed vortex flow and slaked lime are divided into four flows by the cruciform dispersing boards and are further mixed by passage through each of the four regions partitioned by the cruciform dispersing boards. The water and slaked lime that pass around the dispersing board 19a of the first stage reach the dispersing board 19b of the second stage, they are thus divided along an angle different from that of the dispersing board 19a of the first stage, and pass around the dispersing board 19b of the second stage, and thereby they are further mixed. Thereafter, whenever they pass around the dispersing boards 19a and 19b of the third stage to the sixth stage, they are divided and mixed. By this operation, slaked lime is completely dispersed in water and slurried. The slurry is discharged from the lower opening of the dispersing pipe 11, falls into the slurry tank 30 and is stored therein.

The mixing apparatus 100 according to this embodiment uses the cyclone type cylindrical member 10 having a shape imitating a cyclone used as a centrifugal machine, and has such a structure that while a water flow (liquid flow) is made to fall on the inner wall of the cyclone type cylindrical member 10 while swirling, slaked lime (fine particles) is made to fall to the central part so that the slaked lime should be caught by the vortex flow formed around the opening 17 at the center thereof. Accordingly, the slaked lime does not directly contact with the inner wall of the cyclone type cylindrical member 10, therefore aggregates of the slaked lime do not adhere to the inner wall, and the slaked lime can be slurried without causing clogging.

Moreover, because the water flow swirling on the inner wall of the cyclone type cylindrical member 10 is accelerated toward the end of the conical portion 10b, the pressure in the cyclone type cylindrical member 10 becomes negative around the lower opening 17. Therefore, the fine particles charged from the fine particle charging pipe 13 are aspirated toward the lower opening 17 around which the pressure becomes negative, and thus dusts hardly fly. As a result, any conventional dust collecting filter apparatus for removing dusts is not required for the mixing apparatus of this embodiment, and maintenance of a dust collecting filter apparatus is not required either.

Moreover, as apparent from FIGS. 1 and 2, the mixing apparatus 100 of this embodiment has a simple cylindrical structure, and therefore it can be easily produced at a low cost. Furthermore, because the mixing apparatus 100 is small, it can be mounted on the slurry tank 30, and it is unnecessary to separately secure a place for installation of the apparatus beside the slurry tank 30. In addition, it is also easy to remove the mixing apparatus 100 from the slurry tank 30. Therefore, the mixing apparatus 100 can be easily installed at low cost on the slurry tank 30 requiring an apparatus for slurrying, and can be removed as required. Moreover, because the mixing apparatus 100 has such a structure that fine particles should not contact with the inner wall as described above, fine particles do not stick to the inner wall, and the maintenance thereof is also easy.

In the mixing apparatus 100 of the aforementioned embodiment, when the amount of water supplied from the liquid feeding pipe 12 is large, the flow rate of the vortex flow also becomes large, and it is completely mixed with fine particles in the cyclone type cylindrical member 10, and slurrying is attained. When the mixing is carried out under such a condition, the dispersing pipe 11 can be removed from the mixing apparatus 100, and the cyclone type cylindrical member 10 alone can be used.

The shape and arrangement of the dispersing boards 19a and 19b disposed in the dispersing pipe 11 are not limited to the cruciform shape and arrangement used in this embodiment, and they may be in a desired shape. Moreover, as for the number of the dispersing boards 19a and 19b, although six stages of the dispersing boards 19a and 19b are used in this embodiment, it may be increased or decreased depending on the conditions of slurrying.

Further, although an example of producing calcium hydroxide slurry by using slaked lime (calcium hydroxide) as fine particles and water (emulsifying water) as liquid was explained in the aforementioned embodiment, the mixing apparatus of this embodiment is not used only for slurrying of slaked lime and water, but it can be used in order to carry out slurrying by mixing of any kinds of fine particles and liquids. For example, it can be used for slurrying fine particles of cement, quicklime, calcium carbonate, magnesium hydroxide, magnesium oxide, calcium hydroxide, clay minerals and the like by mixing with liquid such as water.

In addition, although the axial direction of the fine particle charging pipe 13 is set to be parallel to the axial direction of the cyclone type cylindrical member 10 in an aforementioned embodiment, it may not be exactly parallel, and it may be set so that fine particles can be charged to the central part of the cylindrical member 10 without contacting with the inner wall of the cylindrical member 10. Further, the axial direction of the liquid feeding pipe 12 may not be exactly parallel to the tangential direction of the cylindrical member 10, and it may be set so that liquid can be supplied so as to swirl on the inner wall of the cylindrical member 10.

Moreover, although fine particles are charged into the cyclone type cylindrical member 10 from the fine particle charging pipe 13 in the embodiment described above, it is also possible to use a configuration that the fine particle charging pipe 13 is not provided, but only an opening is provided at the center of the lid member 15, and fine particles are charged through this opening. In this case, the fine particle conveying hose 42 connected to the fine particle carrying-in vehicle 41 can be directly inserted into the opening of the lid member to charge fine particles.

Hereafter, examples of the present invention will be explained.

EXAMPLE 1

As an example, slaked lime powder and emulsifying water was slurried by mixing using the mixing apparatus 100 having the structure shown in FIGS. 1 and 2 according to the aforementioned embodiment. As for the sizes of the mixing apparatus 100 used in this example, the cylinder portion 10*a* of the cyclone type cylindrical member 10 had an inner diameter of 300 mm and a length of 600 mm, and the conical portion 10*b* of the same had an inner diameter of 150 mm at the lower end and a length of 400 mm. The liquid feeding pipe 12 was connected to the cylinder portion 10*a* at a position of 300 mm from the upper end thereof. The liquid feeding pipe 12 had an internal diameter of 80 mm. The fine particle charging pipe 13 had an internal diameter of 100 mm. The dispersing pipe 11 had an internal diameter of 150 mm and a length of 800 mm, and was provided with the dispersing boards 19*a* and 19*b* of six stages as shown in FIG. 2.

While slaked lime powder was supplied at a rate of 10 to 40 ton/hour from the fine particle charging pipe 13, emulsifying water (industrial water) having a water temperature of 1 to 85° C. was injected from the liquid feeding pipe 12 at a rate of 25 to 75 m$^3$/hour. As a result, the slaked lime powder was mixed with the emulsifying water by the mixing apparatus 100, and thus calcium hydroxide slurry having a dissolution concentration of 20% or less could be produced. The produced slurry fell into and was stored in the slurry tank 30.

Dusting from the mixing apparatus 100 or the slurry tank 30 was not observed. Moreover, when the slurry in the slurry tank 30 was examined, any aggregate of the fine particles due to defective mixing was not observed.

EXAMPLE 2

By using the same mixing apparatus 100 as that used in Example 1, while quicklime powder was charged from the fine particle charging pipe 13 at a rate of 1 ton/hour, slaking water (industrial water) was supplied from the liquid feeding pipe 12 at a rate of 17 m$^3$/hour.

The quicklime powder was mixed with the slaking water by the mixing apparatus 100, thus became a suspension (slurry) and fell into the slurry tank 30. Dusting from the mixing apparatus 100 or the slurry tank 30 was not observed. As for the suspension (slurry) in the slurry tank 30, neither aggregates of the fine particles due to defective mixing nor non-slaked substance was observed.

EXAMPLE 3

By using the same mixing apparatus 100 as that used in Example 1, while cement powder was charged from the fine particle charging pipe 13 at a rate of 10 to 80 ton/hour, dissolution water (industrial water) having a water temperature of 1 to 85° C. was supplied from the liquid feeding pipe 12 at a rate of 25 to 75 m$^3$/hour. The cement powder was mixed with the dissolution water by the mixing apparatus 100, thus became slurry and fell into the slurry tank 30. Thus, slurry having a dissolution concentration of 50% or less could be produced. Dusting from the mixing apparatus 100 or the slurry tank 30 was not observed. As for the suspension (slurry) in the slurry tank 30, no aggregate of the fine particles due to defective mixing was observed.

EXAMPLE 4

In Example 4, used was a structure that fine particles (calcium carbonate) stored in a fine particle storage silo were conveyed by a screw conveyor and charged into the mixing apparatus 100. As the mixing apparatus 100, an apparatus having the same configuration as used in Example 1 was used. The screw conveyor cut down calcium carbonate powder from the fine particle storage silo, conveyed the powder up to the upper part of the fine particle charging pipe 13 of the mixing apparatus 100, and charged the powder into the apparatus. In this example, the screw conveyor was operated so that the calcium carbonate powder should be supplied to the mixing apparatus 100 at a rate of 2 ton/hour. Moreover, emulsifying water (industrial water) was supplied to the liquid feeding pipe 12 of the mixing apparatus 100 at a rate of 10 m$^3$/hour.

The calcium carbonate powder was mixed with the emulsifying water by the mixing apparatus 100, thus became a suspension (slurry) and fell into the slurry tank 30. A dust collector for preventing dusting was installed on the slurry tank 30. Even when operation of the dust collector was stopped, and the top inspection window of the slurry tank 30 was opened, dusting was not observed. As for the suspension (slurry) in the slurry tank 30, no aggregate of the fine particles due to defective mixing was observed.

COMPARATIVE EXAMPLE 1

The mixing apparatus 100 of Example 1 was removed from the fine particle dissolution apparatus used in Example 4. Then calcium carbonate powder was directly charged into the slurry tank 30 from the screw conveyor, and the emulsifying water was directly supplied to the dissolution tank. As a result, dusting was notable, and the dust collector provided on the dissolution tank must be operated.

The invention claimed is:

1. A mixing apparatus for mixing particles and liquid, wherein the apparatus comprises:
    cylindrical body having a lower opening and an upper opening, the cylindrical body having an inner wall surface defining an interior extending along a central axis and having a conical portion with a diameter which decreases in the direction toward the lower opening from the upper opening, wherein the upper opening serves as a charging port for charging the particles;
    a liquid feeding opening provided on an upper side of the cylindrical body for injecting the liquid in a peripheral direction on the inner wall surface of the cylindrical body in order to make the liquid fall along the inner wall of the cylindrical body while swirling in a vortex;
    a particle charging pipe communicating with said upper opening, having a central axis aligned with the central axis of the cylindrical body and charging particles into the cylindrical body along a path extending along the central axis of the cylindrical body, from the particle charging ripe to the lower opening of the cylindrical body;

a dispersing pipe connected to the lower opening of the cylindrical body; and disposed in series along the central axis in the dispersing pipe, at least two stages of dispersing boards for dispersing the particles in the liquid, each dispersing board being formed of a plurality of tabular members joined in a cruciform arrangement.

2. The mixing apparatus according to claim 1, wherein the cylindrical body further includes a cylinder portion having a constant inner diameter joined at one end to the conical portion and extending to the upper opening, and wherein the liquid feeding opening is provided on a side of the cylinder portion.

3. The mixing apparatus according to claim 1, wherein the upper opening of the cylindrical body is covered with a lid member, and the particle charging pipe is inserted through the lid member at the center thereof, into the interior of the cylindrical body.

4. The mixing apparatus according to claim 1 wherein the at least two dispersing boards are spaced along the central axis, each dispersing board having an angular orientation on the central axis different from the angular orientation of an adjacent dispersing board.

5. The mixing apparatus according to claim 4 wherein each dispersing board has a constant cross-section perpendicular to the central axis, in the shape of a cross, throughout its length along the central axis.

6. The mixing apparatus according to claim 5 wherein each dispersing board divides flow of liquid and fine particles into separate and parallel flow paths.

7. The mixing apparatus according to claim 4 wherein each dispersing board is arranged to divide flow of liquid and particles into separate and parallel flow paths.

8. The mixing apparatus according to claim 4 wherein each dispersing board has an angular orientation shifted by 45° from the orientation of an adjacent dispersing board.

9. The mixing apparatus according to claim 4 wherein a liquid feed pipe is joined to the cylindrical body at the liquid feeding opening and has an axis oriented to feed the liquid into the interior of the cylindrical body in a direction parallel to a tangent to the inner surface.

10. The mixing apparatus according to claim 1 wherein each dispersing board divides flow of liquid and fine particles into separate and parallel flow paths.

11. The mixing apparatus according to claim 1 wherein each dispersing board has a constant cross-section perpendicular to the central axis, in the shape of a cross, throughout its length along the central axis.

12. The mixing apparatus according to claim 11 wherein each dispersing board divides flow of liquid and fine particles into separate and parallel flow paths.

13. The mixing apparatus according to claim 12 wherein plural dispersing boards are spaced along the central axis and wherein each dispersing board has an angular orientation shifted by 45° from the orientation of an adjacent dispersing board.

14. The mixing apparatus according to claim 1 wherein each dispersing board is arranged to divide flow of liquid and particles into separate and parallel flow paths.

15. The mixing apparatus according to claim 1 wherein the tabular members of each dispersing board extend radially outward from the central axis and are oriented to extend parallel to the central axis.

16. A slurrying apparatus for slurrying particles and liquid by mixing and storing slurry, wherein:

the apparatus comprises a slurry storage tank and a mixing apparatus provided on the slurry storage tank, and the mixing apparatus is the mixing apparatus according to claim 1.

17. The slurrying apparatus according to claim 16, wherein the dispersing pipe has a lower opening, and the lower opening of the dispersing pipe is inserted into an opening provided in the slurry storage tank.

18. A method for mixing particles and liquid, which comprises:

providing a mixing apparatus for mixing the particles and liquid, wherein the apparatus comprises:

a cylindrical body having a lower opening and an upper opening, the cylindrical body having an inner wall surface defining an interior extending along a central axis and having a conical portion with a diameter which decreases in the direction toward the lower opening from the upper opening, wherein the upper opening serves as a charging port for charging the particles;

a liquid feeding opening provided on an upper side of the cylindrical body for injecting the liquid in a peripheral direction on the inner wall surface of the cylindrical body in order to make the liquid fall along the inner wall of the cylindrical body while swirling;

a particle charging pipe communicating with said upper opening and having a central axis aligned with the central axis of the cylindrical body;

a dispersing pipe connected to the lower opening of the cylindrical body; and disposed along the central axis in the dispersing pipe, at least two stages of dispersing boards for dispersing the particles in the liquid, each dispersing board being formed of a plurality of tabular members joined in a cruciform arrangement;

charging the particles through the particle charging pipe and along a path extending along axis of the cylindrical body, from the particle charging pipe to the lower opening of the cylindrical body; and at the same time as the charging, injecting liquid in the peripheral direction of the cylindrical body in the neighborhood of the upper opening, such that the liquid falls along the inner wall of the cylindrical body while swirling to form a vortex, and wherein the particles are introduced into the center of the vortex, whereby the fine particles and the liquid are mixed.

19. A method according to claim 18 further comprising:

repeatedly dividing flow of liquid and fine particles into plural parallel flow paths at an upper end of each dispersing board and converging the plural flow paths at a lower end of each dispersing board to promote mixing of the liquid and fine particles.

20. A method according to claim 19 using plural dispersing boards spaced along the central axis, each dispersing board having an angular orientation on the central axis different from the angular orientation of an adjacent dispersing board.

21. A method according to claim 20 wherein each dispersing board has a constant cross-section perpendicular to the central axis, in the shape of a cross, throughout its length along the central axis.

22. A method according to claim 21 wherein each dispersing board has an angular orientation shifted by 45° from the orientation of an adjacent dispersing board.

23. A method according to claim 18 wherein the particles do not directly contact the inner wail of the cylindrical body and enter the liquid vortex, and wherein each dispersing board is arranged to divide flow of liquid and fine particles into separate and parallel flow paths.

* * * * *

UNITED STATES PATENT AND TRADEMARK OFFICE
CERTIFICATE OF CORRECTION

PATENT NO. : 7,575,364 B2  Page 1 of 1
APPLICATION NO. : 10/547002
DATED : August 18, 2009
INVENTOR(S) : Goto et al.

It is certified that error appears in the above-identified patent and that said Letters Patent is hereby corrected as shown below:

Column 8, line 51 "cylindrical" should read -- a cylindrical --.

Column 10, line 45 "along axis" should read -- along the central axis --.

Column 12, line 2 "wail" should read -- wall --.

Signed and Sealed this

Seventeenth Day of November, 2009

David J. Kappos
*Director of the United States Patent and Trademark Office*